(12) United States Patent
Drikakis

(10) Patent No.: US 8,771,405 B2
(45) Date of Patent: Jul. 8, 2014

(54) GAS FILTER WITH CHAMBER COMPRISING CARBON NANOTUBES FOR FILTERING CO2

(76) Inventor: Dimitris Drikakis, Bedfordshire (GB)

( * ) Notice: Subject to any disclaimer, the term of this patent is extended or adjusted under 35 U.S.C. 154(b) by 0 days.

(21) Appl. No.: 13/638,595

(22) PCT Filed: Mar. 29, 2011

(86) PCT No.: PCT/GB2011/050640
§ 371 (c)(1),
(2), (4) Date: Nov. 6, 2012

(87) PCT Pub. No.: WO2011/121344
PCT Pub. Date: Oct. 6, 2011

(65) Prior Publication Data
US 2013/0042762 A1     Feb. 21, 2013

Related U.S. Application Data

(60) Provisional application No. 61/353,060, filed on Jun. 9, 2010.

(30) Foreign Application Priority Data

Mar. 31, 2010   (GB) .................................. 1005398.1

(51) Int. Cl.
*B01D 53/02*     (2006.01)

(52) U.S. Cl.
USPC ................... 96/108; 96/121; 96/134; 96/135; 96/153; 96/154; 95/90; 423/447.2; 423/447.3; 977/742; 977/745; 977/748; 977/720; 977/752; 355/30

(58) Field of Classification Search
USPC ................... 96/108, 121, 134, 135, 153, 154; 423/447.2, 447.3; 977/742, 745, 748, 977/750, 752; 355/30; 95/90
See application file for complete search history.

(56) References Cited

U.S. PATENT DOCUMENTS

| | | | |
|---|---|---|---|
| 3,501,897 A | 3/1970 | Van Helden et al. | |
| 4,717,401 A | 1/1988 | Lupolo et al. | |
| 4,917,862 A | 4/1990 | Kraw et al. | |
| 7,459,013 B2 * | 12/2008 | Holmes et al. | 96/132 |
| 2005/0126139 A1 | 6/2005 | Sewell, Sr. | |
| 2007/0051240 A1 | 3/2007 | Lin | |
| 2008/0271606 A1 | 11/2008 | Holmes et al. | |
| 2008/0282893 A1 * | 11/2008 | Holmes et al. | 96/154 |
| 2008/0284992 A1 * | 11/2008 | Holmes et al. | 355/30 |
| 2009/0317916 A1 | 12/2009 | Ewing et al. | |

FOREIGN PATENT DOCUMENTS

| | | |
|---|---|---|
| CH | 511 051 | 8/1971 |
| WO | WO2011/121344 | 10/2011 |

OTHER PUBLICATIONS

Lu et al., Comparative Study of CO2 Capture by Carbon Nanotubes, Activated Carbons, and Zeolites, Energy & Fuels 2008, 22, 3050-3056.
Response to UK Office Action in corresponding UK Application No. 1105259.4, filed Feb. 26, 2013, 4 pages.

(Continued)

*Primary Examiner* — Christopher P Jones
(74) *Attorney, Agent, or Firm* — Lempia Summerfield Katz LLC

(57) ABSTRACT

A gas filter comprises a housing (30) having a gas inlet (55), a gas outlet (65) and at least one chamber (70) therebetween containing carbon nanotubes (110). The chamber (70) has a port (90) and is configured for simultaneous gas ingress to and gas egress from the carbon nanotubes (110) through the port (90).

72 Claims, 12 Drawing Sheets

(56) References Cited

OTHER PUBLICATIONS

UK Office Action issued in corresponding Application No. 1105259.4, dated Oct. 29, 2012, 4 pages.
Skoulidas et al., Phys. Rev. Lett. 89, 185901, 2002.
Srivastava et al., Carbon Nanotube Filters, Nature Materials Letters, 3, 612, 2004.
Cinke et al., $CO_2$ adsorption in single-walled carbon nanotubes (SWCNTs), Chemical Physics Letters, 376 (2003) 761-766.
WO, Int'l Search Rep't, PCT/GB2011/050640.
WO, Written Opinion, PCT/GB2011/050640.
WO, Int'l Prelim. Rep't on Pat, PCT/GB2011/050640.
Su et al., Capture of $CO_2$ from flue gas via multi-walled carbon nanotubes (MWCNTs), Science of the Total Environment 407 (2009) 3017-3023.
Hsu S.C., et al., "Thermodynamics and regeneration studies of $CO_2$ adsorption on multiwalled carbon nanotubes," Chemical Engineering Science, Oxford, GB, vol. 65, No. 4, 2009.

* cited by examiner

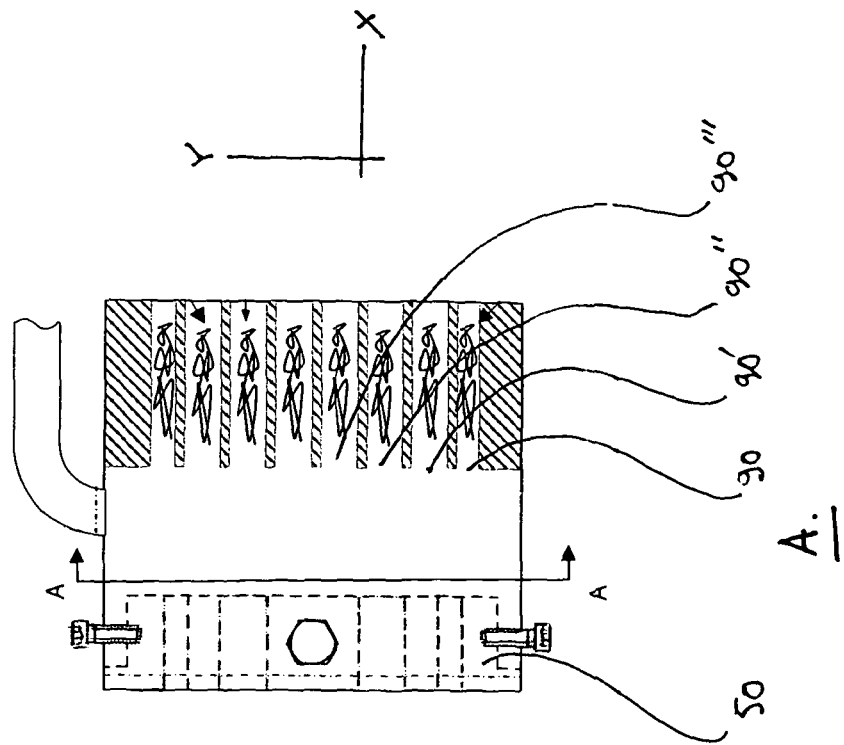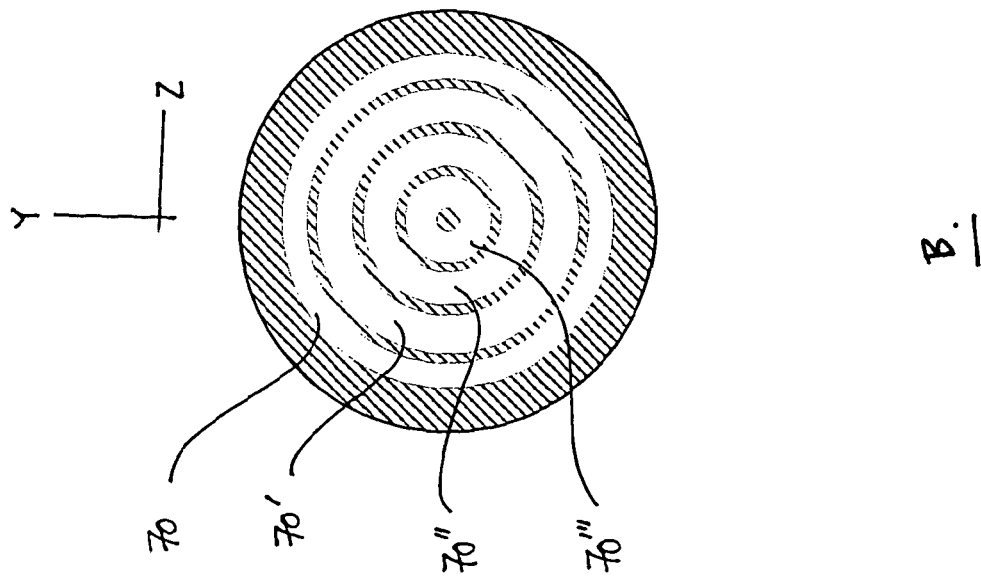
FIG. 10

FIG. 11
A.
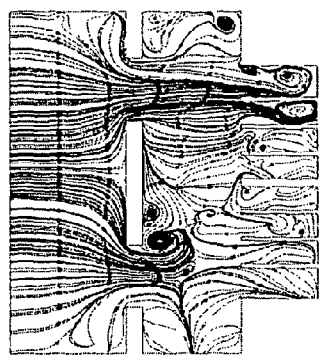
B.
C.

GAS FILTER WITH CHAMBER COMPRISING CARBON NANOTUBES FOR FILTERING CO2

CROSS-REFERENCE TO RELATED APPLICATIONS

This Application is the U.S. National Stage entry of International Application PCT/GB2011/050640, filed on Mar. 29, 2011. That International Application was based on, and this application claims priority from, GB 1005398.1 filed on Mar. 31, 2010. The entire contents of PCT/GB2011/050640 and GB 1005398.1 are incorporated herein by reference. Additionally, this application claims the benefit of provisional U.S. application 61/353,060 filed Jun. 9, 2010, which is identical to GB 1005398.1 and the contents of which are incorporated herein by reference.

TECHNICAL FIELD

The present invention relates to gas filters, in particular filters for extracting carbon dioxide ($CO_2$).

BACKGROUND ART

Exhaust gas filters and filtering systems for removing constituents from exhaust gases of internal combustion engines are known from US2005/0126139.

A carbon nanotube (CNT) consists purely of carbon and is basically a graphene sheet. The sheet is rolled into a tube to form a CNT. By choosing the rolling direction, CNTs with different electrical properties can be generated. The actual tubular arrangement together with the strong carbon-carbon bonds results in a mechanically, chemically and thermodynamically extremely robust structure. The tensile stress necessary to rupture a CNT exceeds that of the strongest steel. Thermodynamically, CNTs are stable in air to up to 750° C. CNTs interact and attract each other through Van der Waals forces that arise from temporary imbalances of the electron distribution within atoms. Through these attracting forces, several CNTs can be put together to form an array of CNTs or can be randomly orientated, thereby keeping their integrity without requiring any additional structural support.

The unique properties of CNTs can be used for highly efficient gas separation. CNTs can have single or multiple walls and can be generated with a defined diameter, which is the key element for gas separation. The separation can be based on adsorption and sieving.

Sieving exploits the variation of geometrical shape and size of molecules: Growing a CNT membrane on a suitable substrate allows the pore size of the membrane to be controlled so as to allow only molecules smaller than the pore diameter to pass. This type of control over the pore size is not possible when using conventional membranes based on polymers. A nano-scale filter using a carbon nanotube membrane is proposed in US Patent 2007/0051240, which discloses the use of a porous supporting component.

Experiments have shown that the transport of gases through CNT membranes is much faster than predicted by traditional continuum theory (Skoulidas et al., *Phys. Rev. Lett.* 89, 185901, 2002). For a range of different CNT membranes the flux was up 8,400 times higher than standard non-slip hydrodynamic flow as it governed the transport in polycarbonate membranes. This is likely caused by the intrinsic smoothness of the CNT walls for which the gas wall interactions are mainly reflective, i.e., collisions do not lose forward momentum and only partially diffusive (Knudsen model with partial slip). This phenomenon has been affirmed by molecular dynamics simulations.

Another major advantage of using CNT based filters over conventional membrane filters is the fact that they can be cleaned repeatedly after each filtration process thus regaining their full filtering efficiency. Because of their high thermal stability, CNT filters can be operated at temperatures of ~400° C., which are several times higher than the highest operating temperatures of the conventional polymer membrane filters (~52° C.) (Srivastava et al., Carbon nanotube filters, *Nature Materials Letters,* 3, 612, 2004).

Adsorption exploits the affinities of a molecule to CNT. Previous studies have investigated the $CO_2$ adsorption in single-walled (Cinke et al., $CO_2$ adsorption in single-walled carbon nanotubes (SWCNTs), *Chemical Physics Letters,* 376 (2003) 761-766) and multi-walled CNTs (Su et al., Capture of $CO_2$ from flue gas via multi-walled carbon nanotubes (MWCNTs), *Science of the Total Environment* 407 (2009) 3017-3023).

Cinke et al. investigated the $CO_2$ adsorption on HiPCo (high pressure CO disproportionation process) SWCNT in a temperature range of 0° C. to 200° C. SWCNTs adsorbed nearly twice the volume of $CO_2$ compared to activated carbon. They performed experiments showing a $CO_2$ heat of adsorption of 2303 J/mol (0.024 eV) in SWCNTs. They found that the adsorption is mainly a physisorption process[1] and further confirmed through computations using second-order Möller-Plesset perturbation theory a similar binding energy showing that the $CO_2$ is physisorbed side-on to the nanotube. Physisorption is due to van der Waals forces between adsorbent molecules and adsorbents, whereas chemisorption takes place due to chemical interactions between the adsorbent molecules and the surface functional groups of adsorbents.

Su et al. showed that the adsorption capacities of $CO_2$ on CNTs and on modified CNTs via 3-aminopropyl-triethoxysilane (APTS) solution decreased with temperature indicating the exothermic nature of adsorption process and increased with water content in air at 0%-7%. They also confirmed that the mechanism of $CO_2$ adsorption on CNTs and CNT(APTS) is a physisorption process. CNT(APTS) showed good adsorption performance of $CO_2$ at 20° C. as compared to other carbon and silica adsorbents reported in the literature.

The present invention has as an objective the mitigation of at least one of the disadvantages of the gas filters discussed above.

DISCLOSURE OF INVENTION

According to a first aspect of the invention, there is provided:

a gas filter comprising a housing having a gas inlet, a gas outlet and at least one chamber therebetween containing carbon nanotubes, the chamber having a port and being configured for simultaneous gas ingress to and gas egress from the carbon nanotubes through said port.

While the gas is in the chamber, impurities such as $CO_2$ are removed by the carbon nanotubes. A chamber having a port through which both gas ingress and gas egress takes place is potentially able to provide the CNTs with more support than an arrangement, such as that known from the aforementioned US 2007/0051240, in which the gas enters through a first port or inflow boundary on one surface of the CNT filter and exits through a second port/outflow boundary on the other, opposite surface of the CNT. This known arrangement requires a porous supporting component for the carbon nanotubes, not least because of the pressure gradient across the filter. No such pressure gradient is required in the present invention, as reflected in the fact that both gas ingress to and gas egress from the carbon nanotubes take place across the same port at the same time. Without the need for a supporting component, the filter of the present invention may be easier to manufacture. It may also make the filter easier to scale up or down depending on the application, thereby increasing its versatility.

The physico-chemical properties of carbon nanotubes include adsorption and physisorption. Preferably, the gas filter is configured to filter out $CO_2$, the $CO_2$ molecules piling up in various CNT sites including outer surface, inner surface, interstitial channels and grooves. Such a filter may be used as a small scale $CO_2$ gas separation device in car exhausts; a larger-scale $CO_2$ gas separation device for coal and hydrocarbon based power stations; gas sweetening: separation of constituents of natural gases such as separation of $H_2$ from $CO_2$; attached to internal combustion engines; as well as in space applications.

The carbon nanotubes may be single-walled carbon nanotubes (SWCNTs). The carbon nanotubes may be modified CNTs. Preferably, they are modified CNTs via 3-aminopropyl-triethoxysilane (APTS). It has been shown (Lu et al. Energy & Fuels 2008, 22, 3050-3056) that modified CNTs via APTS encompass higher adsorption rates than other materials such as granular activated carbon and zeolites. The carbon nanotubes may be multi-walled carbon nanotubes (MWCNTs). Both carbon and oxygen atoms show a strong interaction with the CNTs, resulting the formation of a cylindrical layer coaxial with the CNT into its interior leaving the central part of the CNT empty; this is happening because $CNT\text{-}CO_2$ attractions are stronger than $CO_2$—$CO_2$. This fact can be exploited by the filter cartridge by using MWCNTs, where the external wall of each internal nanotube behaves as an internal one. The carbon nanotubes used in the gas filter may comprise any combination of the above. They may also be arranged in bundles.

The gas filter may comprise only one, single chamber, i.e. it may consist of a single chamber. Alternatively, the gas filter may comprise multiple chambers, preferably at least four chambers.

The chamber may be cylindrical and may have a port defining a circular area through which gas ingress and egress takes place.

The chamber may be annular. The chamber may have a port defining an annular area through which gas ingress and egress takes place. The gas filter may comprise a plurality of concentric annular chambers. The chambers may be defined between a plurality of concentric, axially-extending walls.

Alternatively, an annular chamber may have a port defining a cylindrical area through which gas ingress and egress takes place. The gas filter may comprise a plurality of co-axial annular chambers, which may be defined by a plurality of axially-spaced, radially-extending walls.

The gas inlet of the gas filter may be configured to promote gas flow circulation around the carbon nanotubes in the at least one chamber, thus facilitating $CO_2$ adsorption on CNTs. In particular, the gas inlet may be configured to promote flow swirl and jet-like (Kelvin-Helmholtz) instabilities. The gas inlet may have a circular section. The gas inlet may comprise multiple apertures of circular section.

The axis of the port of the at least one chamber may be substantially parallel to the flow axis of the gas inlet (the latter corresponding to direction of gas flow through the gas inlet). Where the gas inlet is formed in a first wall of the housing, the port of the at least one chamber may be formed in a second wall facing the first wall. Alternatively, the axis of the port of the at least one chamber may be substantially perpendicular to the flow axis of the gas inlet.

Depending on the application the number and size of the circular inlets and cavities may vary, resulting in a design that is easily scalable.

At least one nanofilter may be placed at the gas inlet of the gas filter, thereby allowing the gas mixture to flow into the gas filter while preventing the nanotubes flowing out of the gas filter.

At least one nanofilter may also be placed at the gas outlet of the gas filter, thereby allowing the filtered gas mixture to flow out of the gas filter while preventing the nanotubes flowing out of the gas filter.

The gas filter housing may be a cylinder. The gas inlet may be formed in a first wall at one end of the cylinder. The first wall may be releasably attached to the housing, thereby allowing the replacement of nanotubes inside the cartridge.

The filtered gas will be taken out of the gas filter through a gas outlet or exhaust. The flow axis of the gas outlet may be substantially parallel to the flow axis of the gas inlet. Where the housing is a cylinder, the gas outlet may be formed in a second wall at the opposite end of the cylinder to the first wall.

Alternatively, the flow axis of the gas outlet may be substantially perpendicular to the flow axis of the gas inlet. Where the housing is a cylinder, the gas outlet may be formed in the side, circumferential wall of the cylinder.

In a second aspect of the invention, there is provided a gas filtration device comprising a gas filter as set out elsewhere, an entry flow section configured to supply gas to the gas inlet of the gas filter; and a gas exhaust section configured to exhaust gas from the gas outlet of the gas filter.

The entry section may comprise at least one nanofilter. The entry section may also comprise at least one mass flow meter and/or at least one $CO_2$ flow sensor. The gas mixture may be supplied to the entry section through an incoming gas pipe.

Henceforth, by "gas mixture" we refer to any gas mixture containing $CO_2$, or atmospheric air, if the device is to be used on a large scale for $CO_2$ filtration and separation from the atmosphere. However, the gas filter may also be suitable for filtering out gases other than $CO_2$.

For $CO_2$ filtration from atmospheric air, it will be required compression of air in order to create sufficient pressure difference across the filter, which would act as the driving force for filtration. Thus the invention also provides a gas filtration system comprising a gas filter as set out above and a compressor for feeding gas into the gas inlet. The energy required for adiabatic compression to twice the atmospheric pressure is estimated to be approximately 1.37 kJ/mol. In the case of $CO_2$ filtration from atmospheric air and for significant uptake the compression may need to increase by a factor of five corresponding to energy of approximately 3.64 kJ/mol.

BRIEF DESCRIPTION OF DRAWINGS

Embodiments of the invention will now be described by way of example with reference to the accompanying drawings in which:

FIG. 10A is a longitudinal sectional view of a fourth embodiment of a gas filter according to the present invention. FIG. 10B is a view taken through section line AA in FIG. 10A.

FIG. 11A presents stream-traces from CFD simulations, viewed in section along the longitudinal axis of a device, for the arrangement of chambers shown in FIG. 11 together with the circular inlet of FIG. 6. FIGS. 11B and C present stream-traces viewed at two different sections perpendicular to the flow axis of the device.

DETAILED DESCRIPTION OF SPECIFIC EMBODIMENTS

Figure 1:
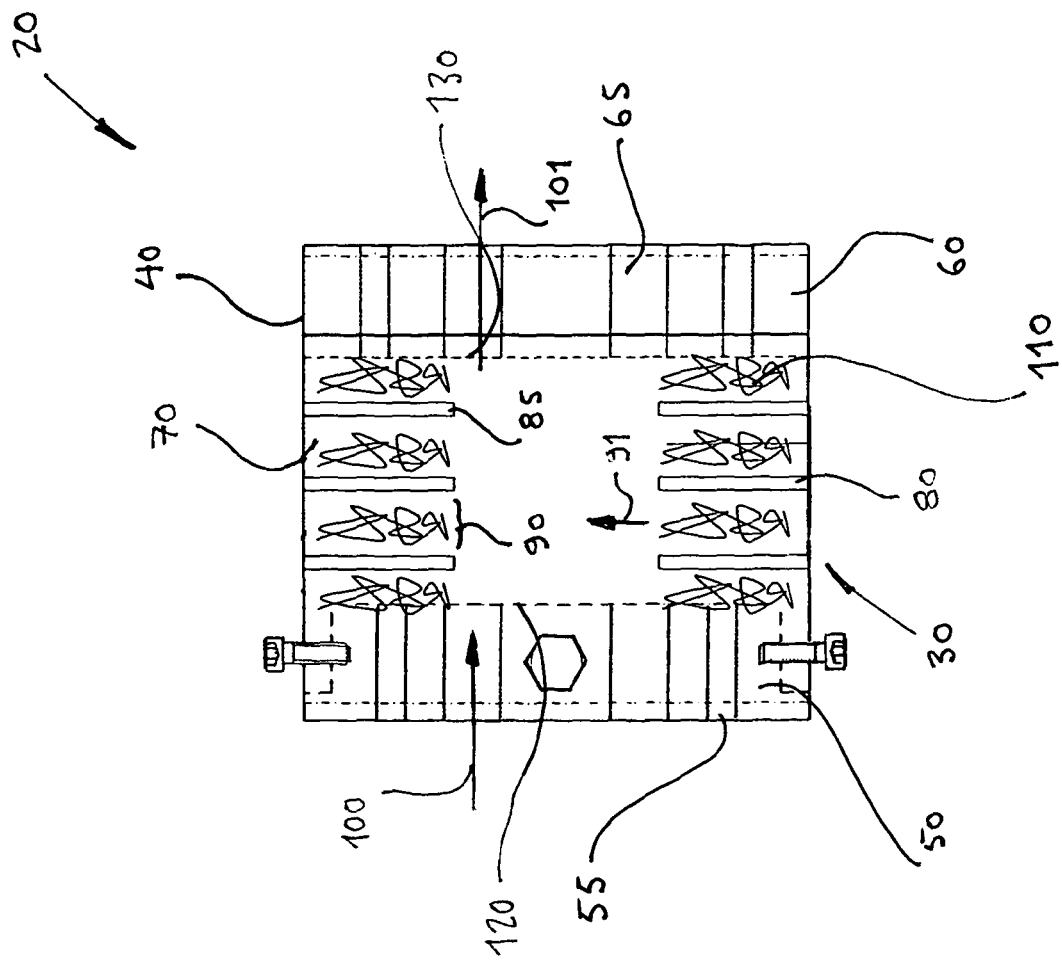
FIG. 1 is a sectional view taken along the longitudinal axis of a gas filter according to a first embodiment of the present invention.

Referring to FIG. 1, gas filter 20 comprises a cylindrical housing 30 having a tubular body 40 closed at one end by an inlet wall 50 and at the opposite end by an outlet wall 60. Inlet wall 50 has gas inlet ports 55 while outlet wall 60 has gas outlet ports 65.

Multiple annular cavities or chambers 70 are arranged co-axially along the inner surface of the tubular body 40, between the inlet wall 50 and outlet wall 60: in the embodiment shown, at least four annular chambers 70 are defined between the inlet wall 50, outlet wall 60 and three radially-extending dividing walls 80 axially spaced in the direction of the flow axis 100 of the gas inlet ports 55. It will be evident that flow axis 100 lies parallel to the longitudinal axis of the cylindrical filter as a whole.

For each chamber 70, the radially innermost ends 85 of the dividing walls 80 define between them or with the inlet/outlet walls a single port 90 having a cylindrical area. Each chamber is therefore blind: like a blind hole, there is only one way in and out. Thus gas ingress into the chamber and gas egress out of the chamber both take place through the single port 90. Ingress/egress will typically be in a flow direction or axis 91 that is substantially perpendicular to the area/plane of the port. In the embodiment of FIG. 1, this flow axis 91 will be radial and also perpendicular to the flow direction or axis 100 of the gas inlet ports 55. Each chamber contains carbon nanotubes 110, which are surrounded—and which may also be supported—by the annular wall 80 and inner surface of the tubular body 40 defining each chamber. Nanofilters 120,130 in the inlet and outlet walls 50,60 ensure that the nanotubes do not leave the housing.

The carbon nanotubes may, for example, be the c150P type of CNTs provided by Bayer and having a bulk density of 45-95 $Kg/m^3$. The average MWCNT payload mass may be 4.7 grams. Operation may be within the ranges 0°-50° C., 0-1 bar, 50-100% $CO_2$ concentrations and 0.0001-0.0006 $m^3$/min flow rates.

Figure 2:
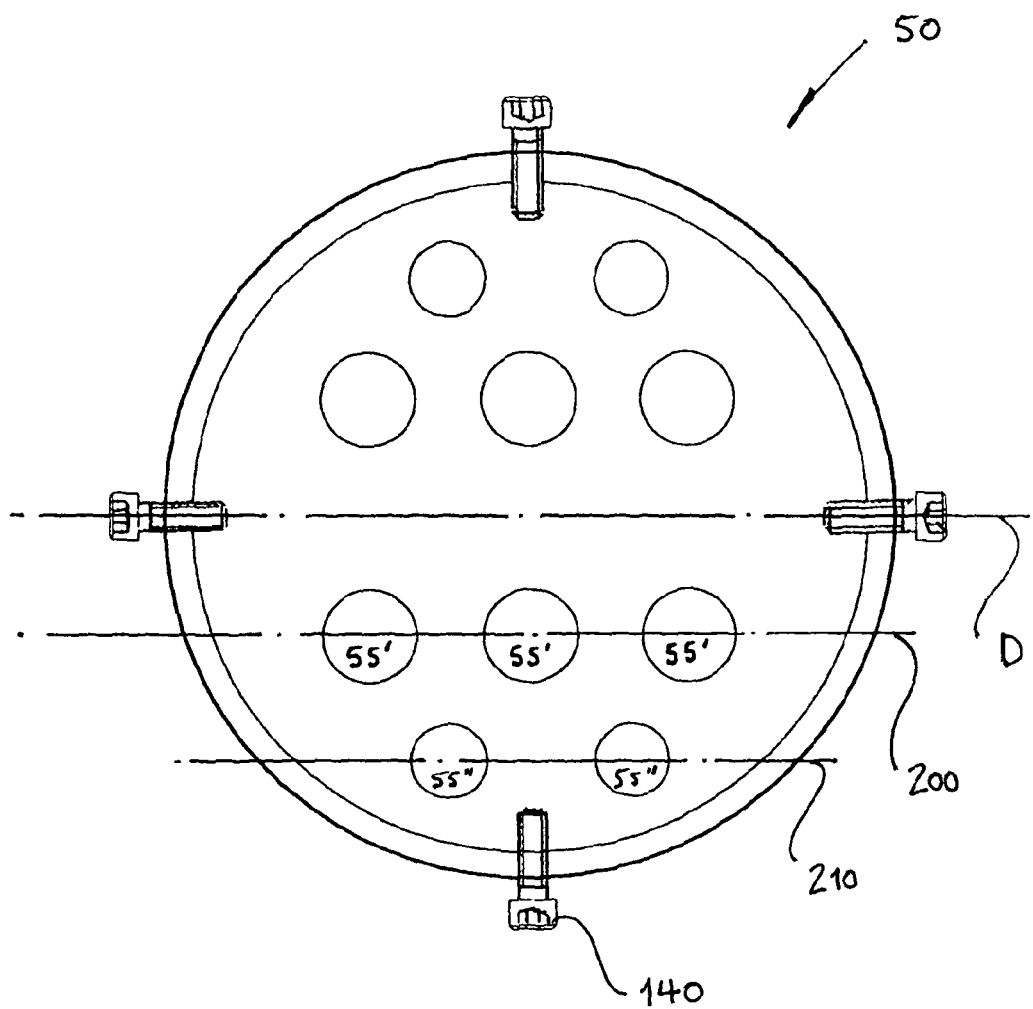
FIG. 2 is an end view of the inlet wall of the gas filter of FIG. 1 as seen in the direction of the longitudinal axis of the gas filter.
Figure 9:
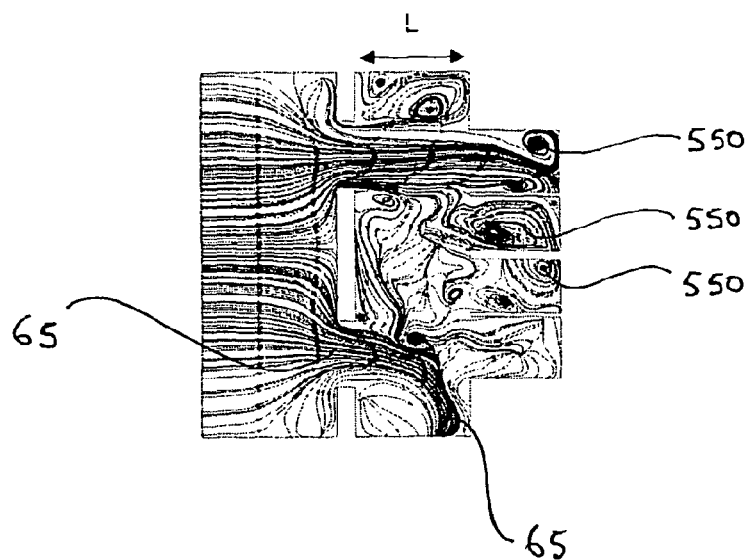
FIG. 9A presents stream-traces, viewed in section along the longitudinal axis of a device, from computational fluid dynamics (CFD) simulations for an embodiment of FIG. 8.
FIGS. 9B and C present stream-traces viewed at two different sections perpendicular to the flow axis of the device.
Figure 9:
Figure 9:
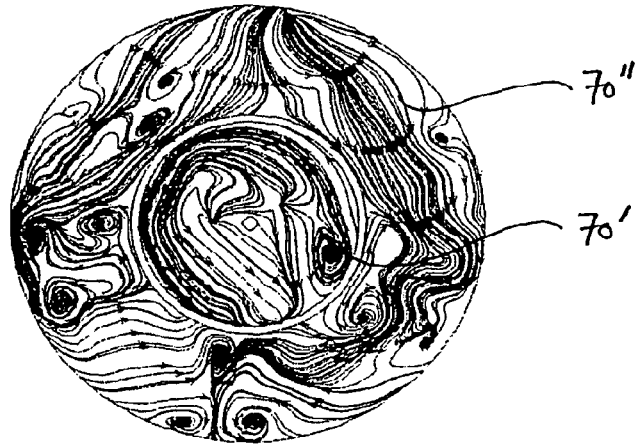

In operation, the gas mixture to be filtered enters the filter 20 through circular holes or ports 55 in the inlet wall 50, as shown in more detail in the end view of FIG. 2. Each port directs the gas mixture into the housing along a flow axis 100. Once inside the housing, the gas mixture enters the blind chambers 70 through their respective single ports 90 where it circulates around the carbon nanotubes which adsorb $CO_2$ from the mixture. The filtered gas then leaves each blind chamber through its respective port, subsequently leaving the filter 20 through ducts 65 in the outlet wall 60 in a flow axis direction 101 substantially parallel to that of the flow inlet. It will be appreciated that gas ingress to each chamber 70 takes place at the same time as gas egress from the chamber, i.e. simultaneously. The gas flow paths are discussed in more detail below with regard to FIGS. 9 and 11; however, it will be evident that, unlike the prior art of US2007/0051240, the chambers lie out of the direct path between the gas inlet and gas outlet. Similarly, the chambers are not subject to a pressure differential between the gas inlet and gas outlet as in US2007/0051240.

To promote the gas flow circulation around the nanotubes, the arrangement of ports 55 in the inlet wall 50 is chosen so as to generate flow swirl and jet-like (Kelvin-Helmholtz) instabilities. In the circular inlet wall 50 of FIG. 2, the ports 55 are arranged symmetrically about a diameter indicated at D. A plurality (in this case three) first ports 55' are arranged in a first line 200 parallel to the diameter. A plurality (in this case two) of second ports 55" are arranged in a second line 210 also parallel to the diameter. The first line is closer to the diameter than the second. The second ports are also smaller in area than the first ports.

FIG. 2 also illustrates how the inlet wall 50 is attached to the tubular body 40 through four screws 140 distributed every 90° around the disc. The screws allow the inner wall to be detached from the body in order to allow the easy replacement of the nanotubes inside the filter. An O-ring (not shown) is also placed between the inlet wall and tubular body to avoid the incoming gas mixture leaking outside the filter.

As regards the outlet wall 60, this comprises several circular ports 65, not necessarily encompassing the same number and topology of outlets as the inlet wall 50. An O-ring is placed around the outlet wall 60 to avoid gas leakage outside the filter.

Figure 3:
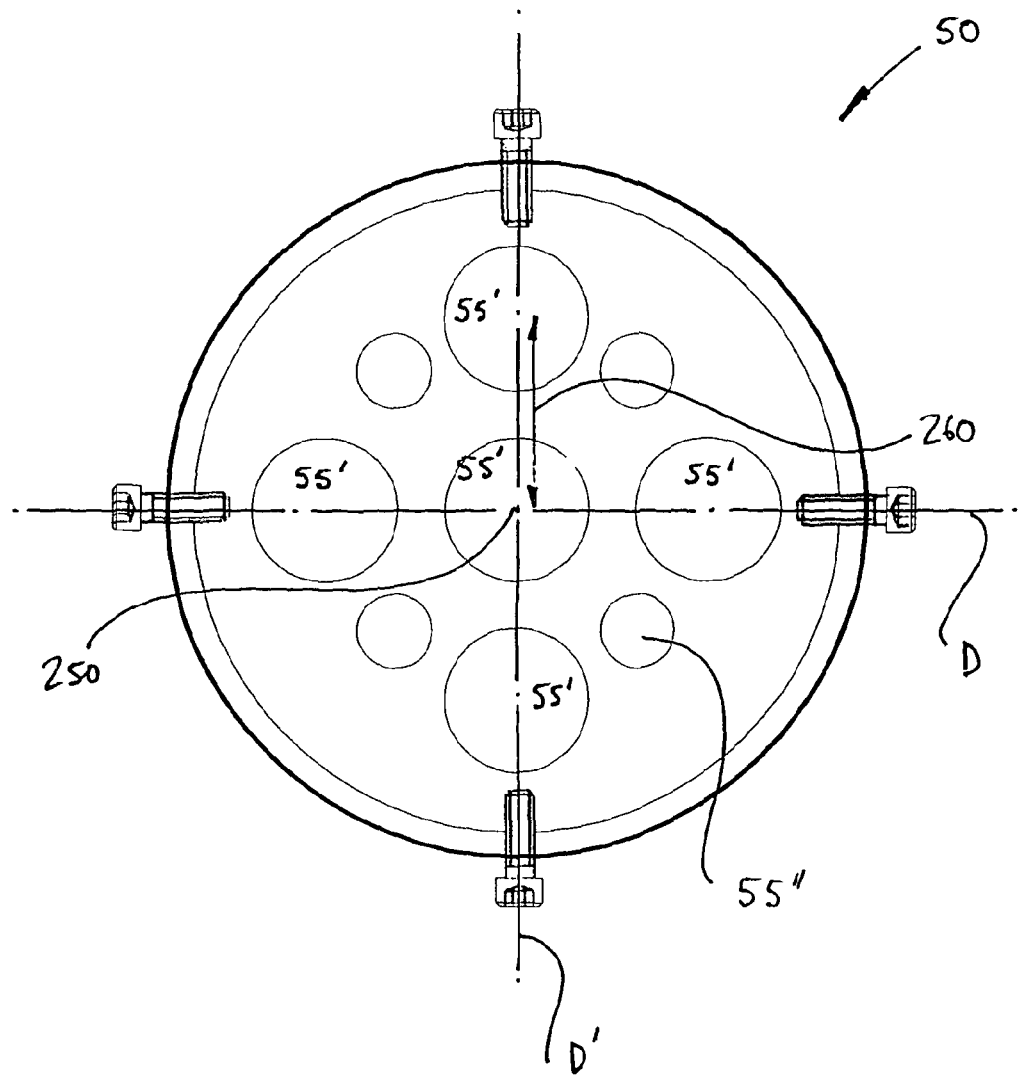
FIG. 3 is an end view of a second embodiment of inlet wall.

FIG. 3 shows an alternative embodiment of circular inlet wall 50 having five ports 55' and four smaller circular orifices or ports 55". The larger ports 55' lie on two orthogonal diameters D and D' of the circular wall, one lying at the intersection of the two diameters and the centres of the other four lying at a radius 260 from the intersection. Smaller ports 55" also lie on the radius 260 and midway between the larger ports. Such a configuration may be preferred for a denser gas environment.

Figure 4:
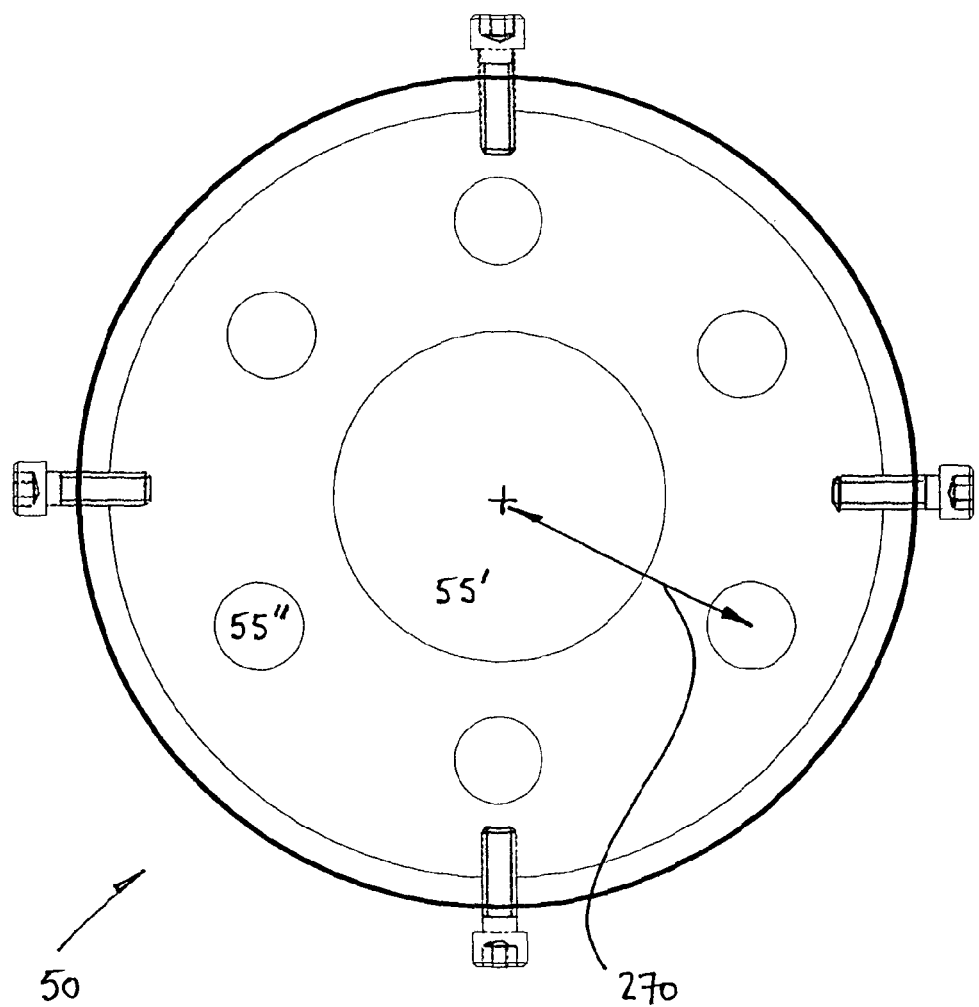
FIG. 4 is an end view of a third embodiment of an inlet wall.
Figure 5:
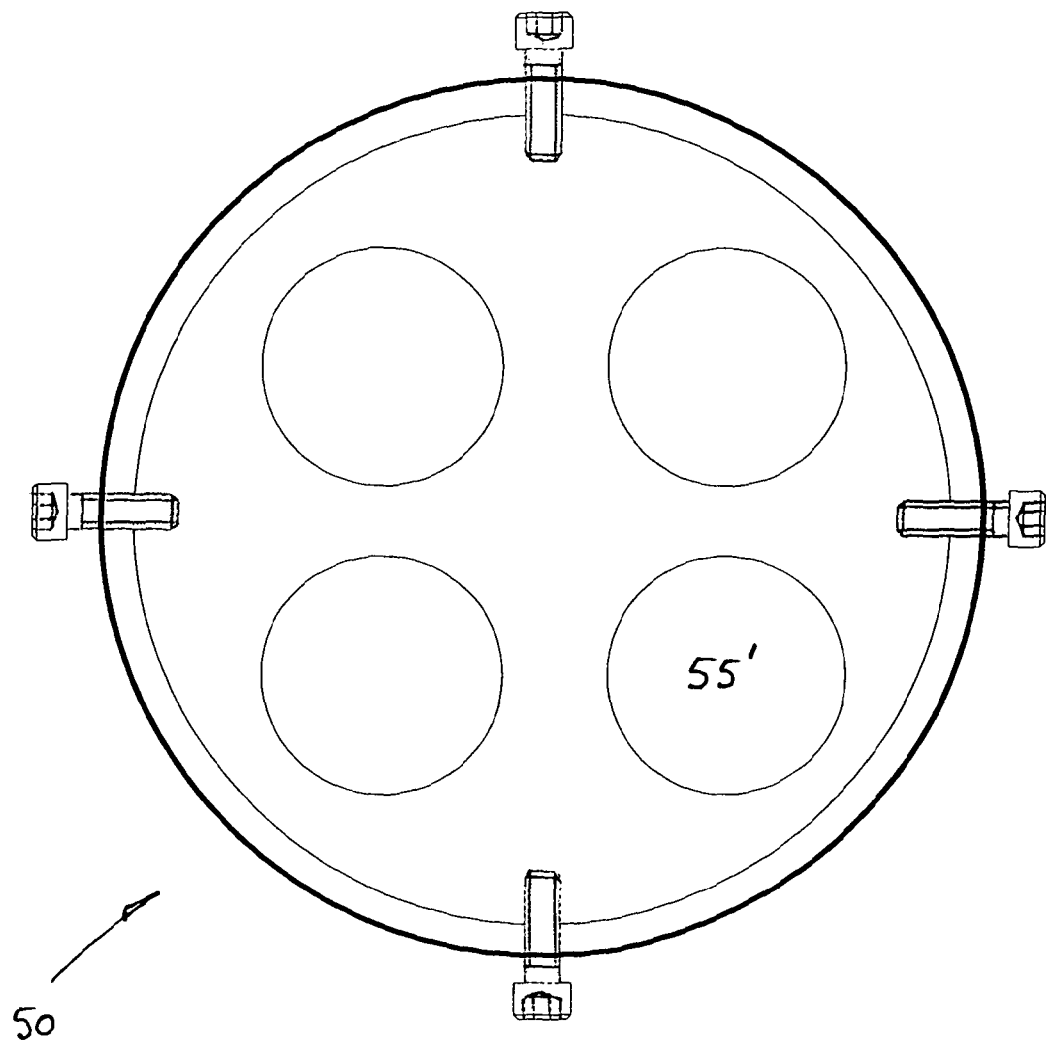
FIG. 5 is an end view of a fourth embodiment of an inlet wall.

FIG. 4 shows another embodiment of circular inlet wall 50 having one centrally located port 55'" and six smaller inlets or ports 55" equispaced around the central port at a radius 270. FIG. 5 shows an alternative embodiment of circular inlet wall having four circular inlets 55', each having approximately one quarter the diameter of the circular inlet wall and equispaced about the centre. The particular design of FIG. 5 is a simple design since it encompasses four circular inlets of the same size. However, depending on the application several micro or nano holes may be fabricated at the front disc. For example, for microscale and/or rarefied gas filtration a larger number of smaller inlets would be preferable for achieving better flow swirl.

Figure 6:
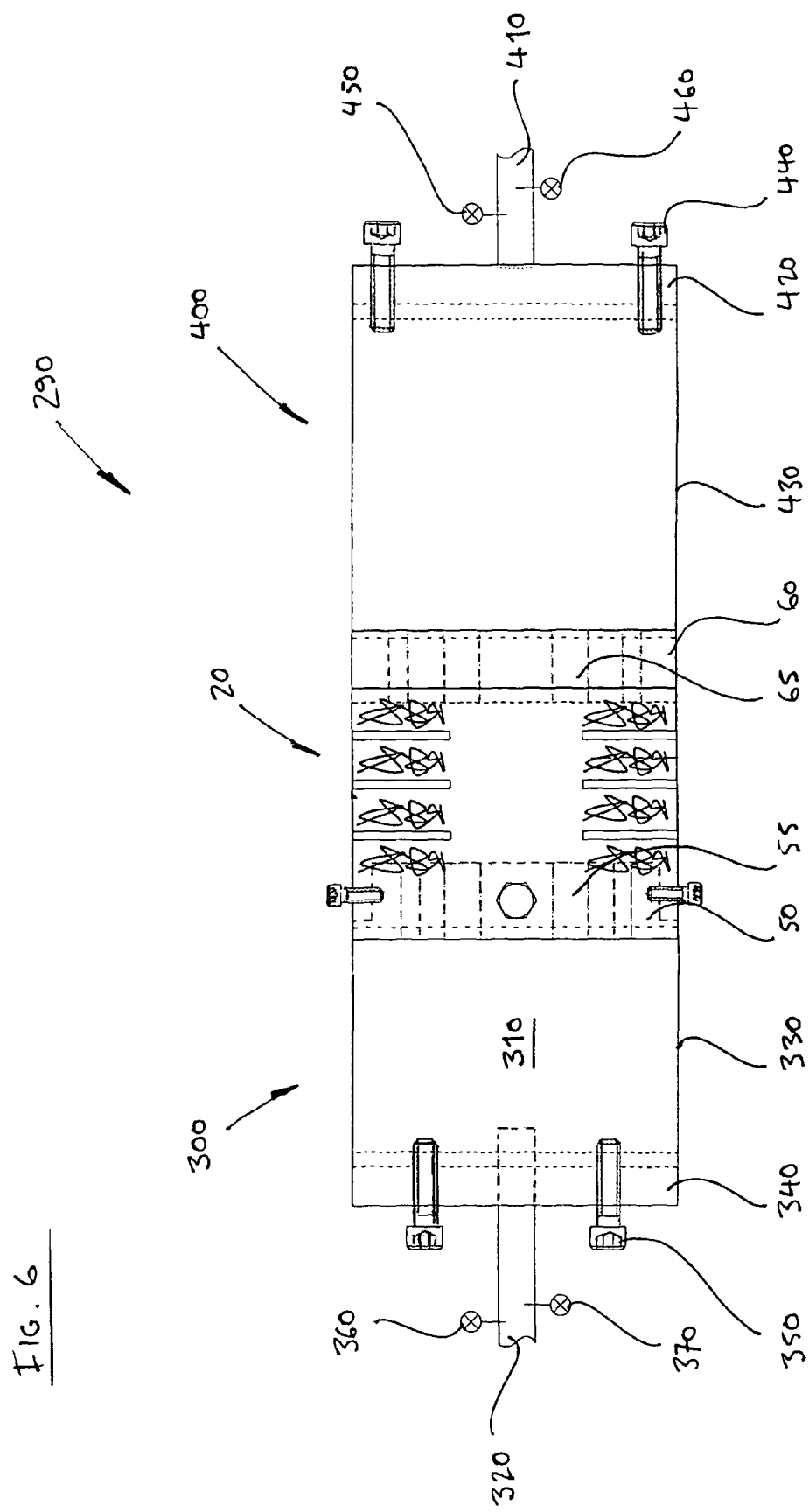
FIG. 6 is a sectional view taken along the longitudinal axis of a gas filtration device incorporating the gas filter of FIG. 1.

FIG. 6 shows a gas filtration device 290 incorporating the gas filter 20 of FIG. 1. The gas mixture is fed to filter 20 by an inflow section 300, the length of which helps ensure that the velocity of the gas mixture on entry to the inlet ports 55 of the gas filter is substantially uniform across the face of the inlet wall 50. This in turn ensures that the inlet ports 55 generate the necessary flows. As shown, the inflow section comprises an entry chamber 310 supplied with gas mixture via an inlet pipe 320 to which a flow meter 360 and $CO_2$ sensor 370 are attached. The inflow/entry section also comprises a nanofilter (not shown). Chamber 310 is defined by a tubular body 330 and a removable disc or end cap 340, a stable connection between the incoming pipe 320 and the entry chamber being achieved by screws 350. An O-ring is placed after the removable disc to avoid any potential air leak.

On leaving the filter 20, the filtered gas enters an exhaust section 400, the length of which helps ensure that the flow of gas from the outlet ports 65 of the filter 20 is not unduly affected by the constriction of flow at the outlet pipe 410 and which might otherwise affect the flow within the gas filter itself. As shown, the outlet pipe communicates with a hole in the middle of a disc or end cap 420 which is attached to the tubular body 430 of the exhaust section by means of screws 440, the number of which may vary depending on the size of the exhaust. The exhaust will be attached to an O-ring to prevent gas leakage and a flow meter 450 and a $CO_2$ sensor 460 may be attached to the exhaust or to the pipe to obtain measurements of the flow rate and $CO_2$ concentrations after filtration.

Figure 7:
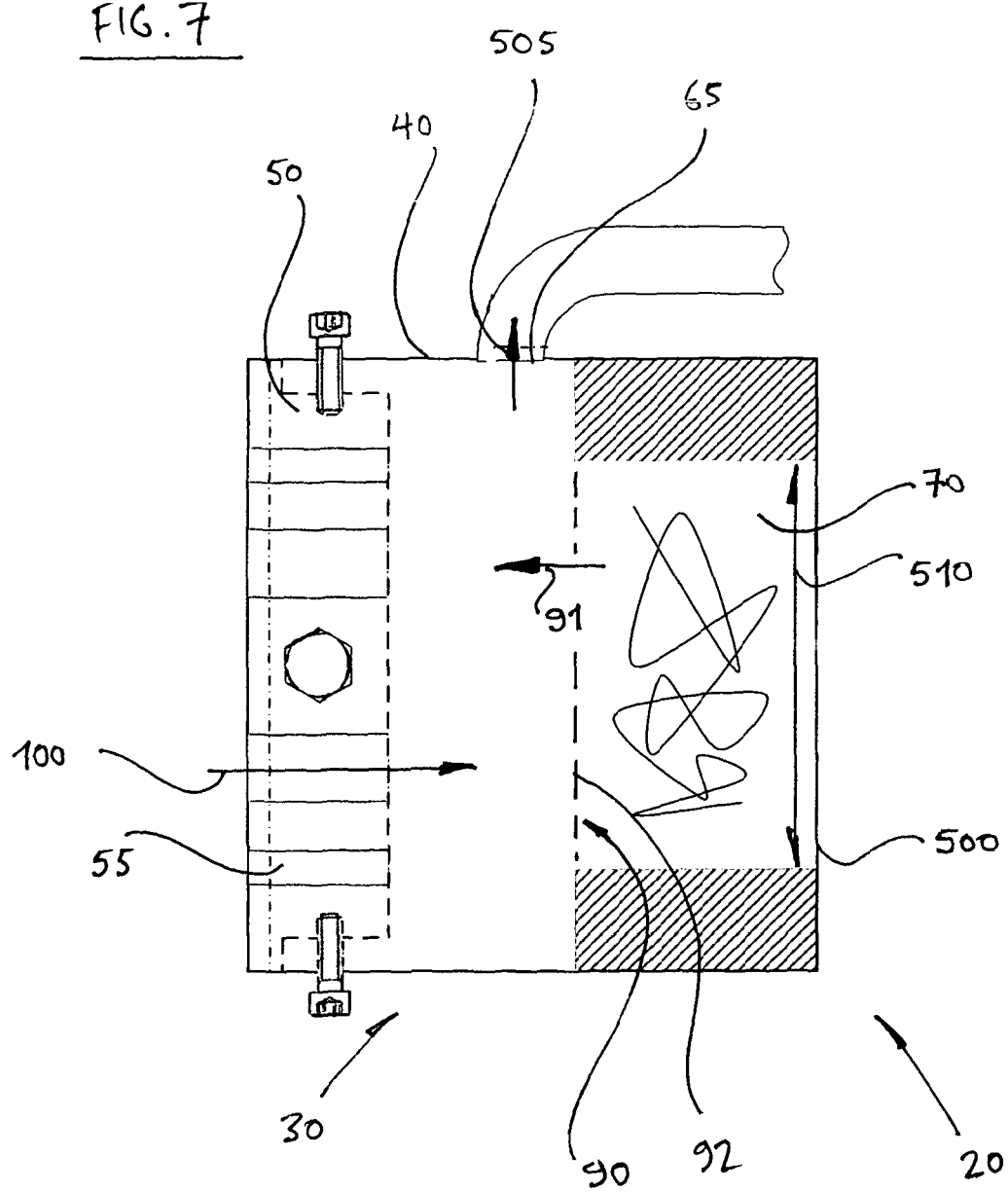
FIG. 7 is a sectional view taken along the longitudinal axis of a second embodiment of a gas filter according to the present invention.

FIG. 7 shows an alternative filter design according to which the gas outlet port 65 is located on the side, circumferential wall of the tubular body 40 of the cylindrical housing 30. The resulting flow direction or axis 505 is perpendicular to the flow axis 100 of the gas inlet 55 of wall 50, which is as shown in FIG. 2. The single CNT-containing chamber 70 is located on an end wall 500 of the housing 30 and lies in the direct path 100 of the incoming flow. Ingress/egress from the chamber 70 will typically be in a flow direction or axis 91 that is substantially perpendicular to the area/plane 92 of the single chamber port 90 and thus substantially parallel to the flow axis 100 of the gas inlet. As shown, the port 90 defines a circular area and the chamber is cylindrical in shape, having a diameter (indicated by arrow 510) of approximately 75% of the diameter of the housing. Flow circulation will occur inside the cavity 70, thus increasing the interaction of the gas mixture with CNTs and facilitating adsorption of $CO_2$ in CNTs. A nanofilter will be placed at the entrance to the exhaust port 65 in order to prevent CNTs escaping from the filter.

FIGS. 8A and B show an alternative embodiment, similar to FIG. 7 in that the CNT-containing chambers are located on an end wall 500 of housing 30, but having multiple inner and outer concentric annular chambers 70' and 70". The inner chamber 70' has a single port 90' having an annular area defined between a central, axially-extending pin 80 and an intermediate, axially-extending annular wall 80' concentric with the pin 80. The single annular-area port 90" of the outer chamber is defined between the intermediate annular wall 80' and outer annular wall 80" concentric therewith. Similar to the embodiment of FIG. 7, in this design the cavities/chambers lie in the direct path 100 of the incoming flow while the gas outlet port 65 is placed on the side of the housing.

FIG. 9A shows stream-traces obtained from CFD simulations at a x-y cross section and illustrating the significant flow recirculation that occurs inside the cavities (note that wherever the stream-traces appear to enter the walls of the cartridge this is a graphics effect due to the three-dimensionality of the flow). It will be seen that both gas ingress to and egress from each chamber takes place at any one time, i.e. simultaneously. As indicated at 550, the flow is contained inside the cavities 70 and does not lead to reverse flow towards the gas inlet port 65. The exhaust port 65 is placed on the side of the housing cartridge. As shown, the exhaust's inlet diameter is smaller than the separation (L) of the plane of the ports 90', 90" and the inlet wall 50.

FIGS. 9B and C show stream-traces obtained from CFD simulations at two different y-z cross sections perpendicular to the section of FIG. 9A. FIG. 9B shows the 15 flow at a section between the plane of the ports and the inlet wall, while FIG. 9B shows the flow at a section through the chambers 70' and 70". The results show significant flow circulation on the y-z plane associated with several vortical structures. The recirculation on this plane is facilitated by the existence of the circular gas inlets of the inlet wall and the annular chambers. The circular gas inlets of the inlet wall lead to Kelvin-Helmholtz instabilities and flow swirl, which is further enhanced by the annular shape of the chambers/cavities. The flow is encapsulated inside and around the cavities, thus increasing the interaction of the gas with the CNTs placed inside the cavities.

Figure 8:
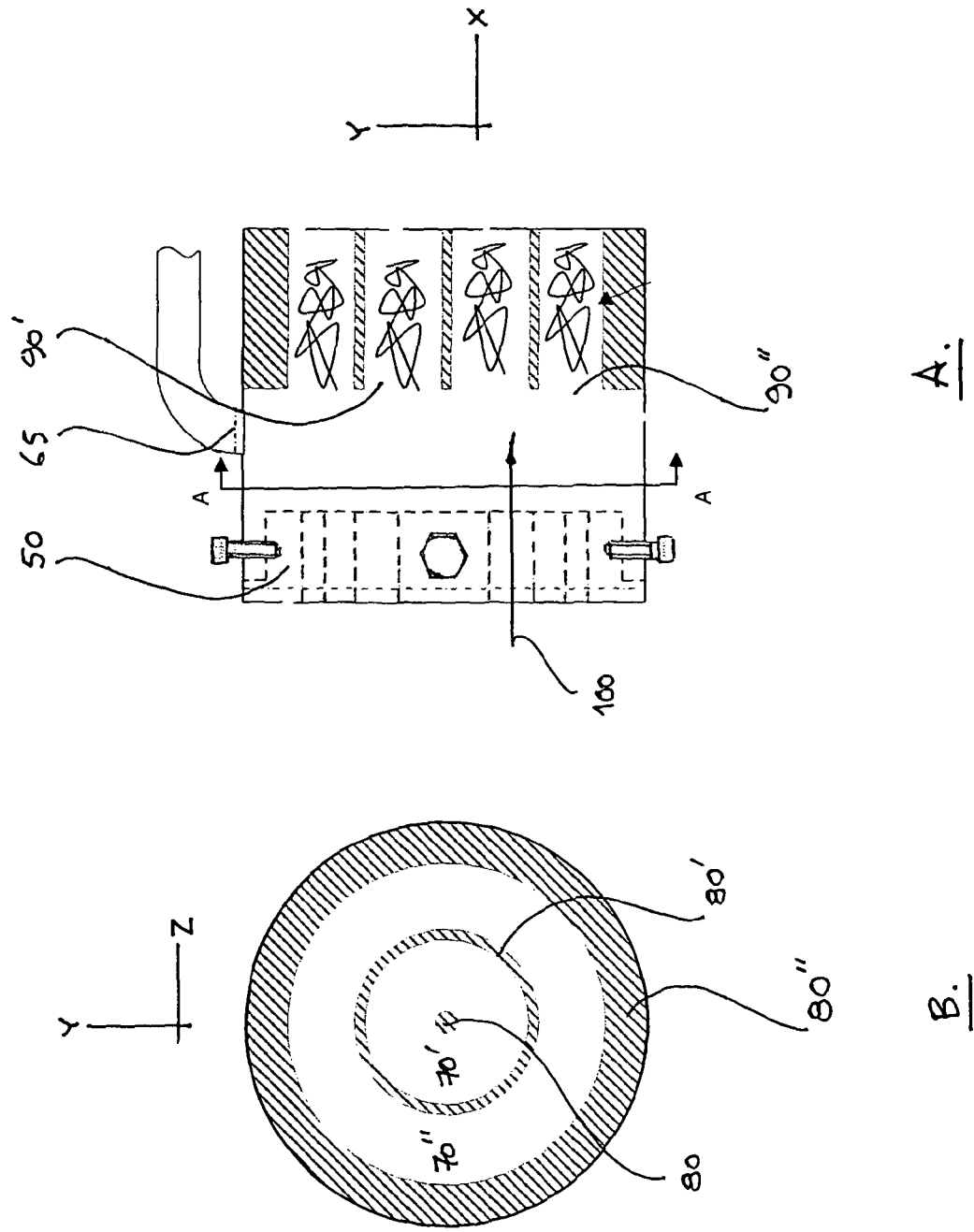
FIG. 8A is a longitudinal sectional view of a third embodiment of a gas filter according to the present invention.
FIG. 8B is a view taken through section line AA in FIG. 8A.

FIG. 10 shows an alternative filter design, similar to that of FIG. 8 but where the end wall 500 contains four annular cavities 70, 70', 70" and 70'". Similar to the cartridge of FIG. 8, the CNTs will be placed inside the cavities; the exhaust is placed on the side of the cartridge; Apart from the geometrical changes with respect to the number of cavities, the design of FIG. 10 remains the same with the one of FIG. 8.

FIG. 11A shows stream-traces obtained from CFD simulations at a x-y cross section for the design of FIG. 10. Similar to the design of FIG. 8, the four-circular cavity design leads to significant flow recirculation inside the cavities and does not lead to reverse flows towards the cartridge's inlet. The size and number of vortices for the designs of FIGS. 8 and 11 differ, as expected, since the flow topology is different. The exhaust is placed on the side of the cartridge. Similar to FIG. 9, the inlet diameter of the gas outlet is smaller than the distance between the inlet wall 50 and the chamber ports 90-90'".

FIGS. 11B and C shows stream-traces obtained from CFD simulations at y-z cross sections between the plane of the ports and the inlet wall and through the chambers 70-70'" respectively. The results show significant flow circulation on the y-z plane associated with several vortical structures. The recirculation on this plane is facilitated by the existence of the circular inlets of the disc cartridge and the four circular cavities. The four-circular cavities lead to more secondary plane (y-z) recirculation than the two-circular cavity design of FIG. 8.

Figure 12:
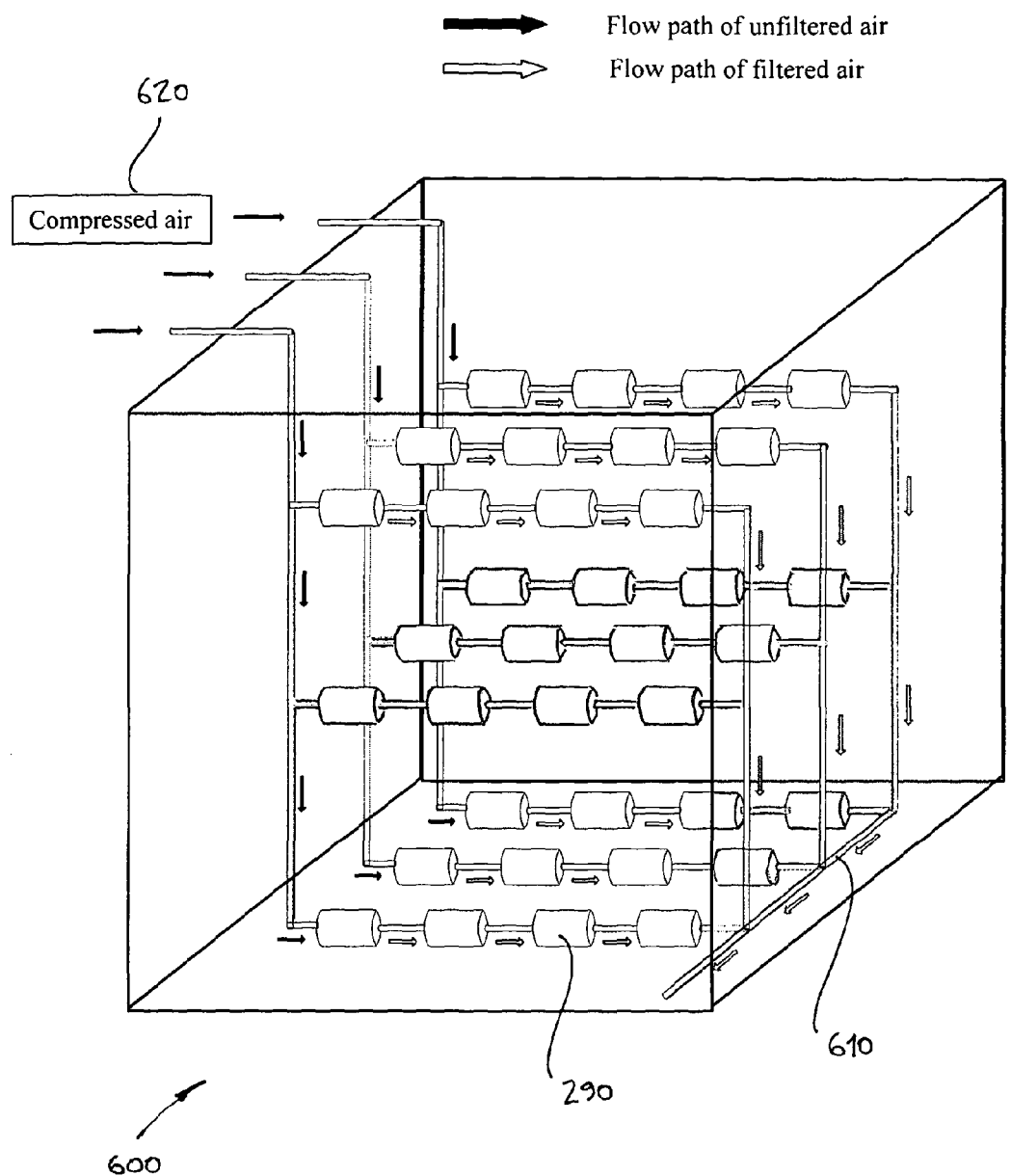
FIG. 12 is a perspective view of an arrangement of several gas filters implemented on industrial scale for removal of $CO_2$ from atmospheric air.

The scalability of the present invention is based on the fact that the size of the cartridge can easily be adapted, including the number and cavity dimensions, to the needs of the application. Furthermore, several CNT cartridges can be combined together to form a bigger filter device. FIG. 12 shows a schematic of large-scale industrial application of the CNT $CO_2$ filtration device. This comprises an array 600 of CNT gas filtration devices 290 through which $CO_2$ will be separated and connected together as indicated at 610. Large-scale installations can be attached to power stations and hydrogen production plants, as well as can be independently developed to filter $CO_2$ from atmospheric air. The embodiment of FIG. 12 concerns an atmospheric $CO_2$ filtration plant in which air is compressed (by compressor 620) in order to create sufficient pressure difference across each CNT filter, which will act as the driving force for filtration. To achieve significant uptake, the air may need to be compressed by a factor of five. The number and type of filters used in a large scale installation may vary depending on the intended filtration capacity.

Other potential applications of the invention include $CO_2$ filtration from internal combustion engines, in particular the attachment of the filter to the exhausts of vehicles, space applications (space stations and spacecraft) and flue gases emitted by ships. Specific application to a CNT device suitable for vehicles has shown that the positive and negative adsorption flux targets need to be greater than 10% per unit mass of MWCNTs. This is based on an average vehicle producing 0.161 g/km of $CO_2$ with a gas volume flow of over 21.23 $m^3$/min and a $CO_2$ concentration in excess of 0.6%. Such a design will involve the use of two payload cells such that one cell is actively filtering, while the other is being unloaded into a $CO_2$ containment vessel. Thus the total mass of MWCNTs carried on board by the vehicle can be reduced, whilst the containment vessel will need to be emptied approximately every 150 km at locations such as fuel stations.

Filters according to the present invention can also be configured to provide a filtration system for gas sweetening: separation of constituents of natural gases, including separation of $CO_2$.

It should be understood that this invention has been described by way of examples only and that a wide variety of modifications can be made without departing from the scope of the invention. In particular, the invention is readily scalable to accommodate different flow rates of gas mixture, which will require adjustment of the dimensions of the device components depending on the application. Moreover, the number and size of the circular inlets and chambers may vary depending on the application. The size and design details of the inflow section—in particular the dimensions of the incoming pipe—may be adjusted depending on the application. The exhaust's design—in particular the dimensions of the exhaust's inlet—may vary depending on the application.

The invention claimed is:

1. A gas filter comprising:
    a housing having a gas inlet comprising a first port, a gas outlet comprising a second port and at least one chamber therebetween containing carbon nanotubes,
    the chamber having a third port for simultaneous gas ingress to and gas egress from the carbon nanotubes through said third port.

2. A gas filter according to claim 1, wherein the gas filter is configured to filter out carbon dioxide.

3. A gas filter according to claim 1, wherein the carbon nanotubes are single-walled carbon nanotubes.

4. A gas filter according to claim 1, wherein the carbon nanotubes are multi-walled carbon nanotubes.

5. A gas filter according to claim 1, wherein the carbon nanotubes are modified carbon nanotubes.

6. A gas filter according to claim 5, wherein the carbon nanotubes are modified via 3-aminopropyl-triethoxysilane.

7. A gas filter according to claim 1, wherein the carbon nanotubes are arranged in bundles.

8. A gas filter according to claim 1, wherein the gas filter consists of a single chamber.

9. A gas filter according to claim 1, wherein the gas filter comprises multiple chambers.

10. A gas filter according to claim 9 and comprising at least four chambers.

11. A gas filter according to claim 1, wherein the chamber is cylindrical and the third port defines a circular area through which gas ingress and egress takes place.

12. A gas filter according to claim 1, wherein the chamber is annular in cross section.

13. A gas filter according to claim 12, wherein the third port defines an annular area through which gas ingress and egress takes place.

14. A gas filter according to claim 12 and comprising a plurality of concentric chambers.

15. A gas filter according to claim 14, wherein the chambers are defined between a plurality of concentric, axially-extending walls.

16. A gas filter according to claim 12, wherein the third port defines a cylindrical area through which gas ingress and egress takes place.

17. A gas filter according to claim 16 and comprising a plurality of co-axial annular chambers.

18. A gas filter according to claim 17, wherein the chambers are defined by a plurality of axially-spaced, radially-extending walls.

19. A gas filter according to claim 1, wherein the gas inlet of the gas filter is configured to promote gas flow circulation around the carbon nanotubes in the at least one chamber.

20. A gas filter according to claim 19, wherein the gas inlet is configured to promote flow swirl and jet-like instabilities.

21. A gas filter according to claim 1, wherein the first port has a circular section.

22. A gas filter according to claim 21, wherein the gas inlet comprises multiple of the first ports of circular section.

23. A gas filter according to claim 1, wherein the axis of the third port of the at least one chamber is substantially parallel to the flow axis of the gas inlet.

24. A gas filter according to claim 23, wherein the gas inlet is formed in a first wall of the housing and the third port of the at least one chamber is formed in a second wall facing the first wall.

25. A gas filter according to claim 1, wherein the axis of the third port of the at least one chamber is substantially perpendicular to the flow axis of the gas inlet.

26. A gas filter according to claim 1, wherein at least one nanofilter is placed at the gas inlet, thereby allowing the gas mixture to flow into the gas filter while preventing the nanotubes flowing out of the gas filter.

27. A gas filter according to claim 1, wherein at least one nanofilter is placed at the gas outlet of the gas filter, thereby allowing the filtered gas mixture to flow out of the gas filter while preventing the nanotubes flowing out of the gas filter.

28. A gas filter according to claim 1, wherein the housing is a cylinder.

29. A gas filter according to claim 28, wherein the gas inlet is formed in a first wall at one end of the cylinder, the first wall being releasably attached to the housing.

30. A gas filter according to claim 1, wherein the flow axis of the gas outlet is substantially parallel to the flow axis of the gas inlet.

31. A gas filter according to claim 30, wherein the gas outlet is formed in a second wall at the opposite end of the cylinder to the first wall.

32. A gas filter according to claim 1, wherein the flow axis of the gas outlet is substantially perpendicular to the flow axis of the gas inlet.

33. A gas filter according to claim 32, wherein the gas outlet is formed in the side, circumferential wall of the cylinder.

34. A gas filtration device comprising:
    a gas filter having a housing with a gas inlet comprising a first port, a gas outlet comprising a second port, and at least one chamber therebetween containing carbon nanotubes, the chamber having a third port for simultaneous gas ingress to and gas egress from the carbon nanotubes through said third port;
    an entry flow section to supply gas to the gas inlet of the gas filter; and
    a gas exhaust section to exhaust gas from the gas outlet of the gas filter.

35. A gas filtration device according to claim 34, wherein the entry section comprises at least one nanofilter.

36. A gas filtration device according to claim 34, wherein the entry section comprises a mass flow meter.

37. A gas filtration device according to claim 34, wherein the entry section comprises a $CO_2$ flow sensor.

38. A gas filtration system comprising:
a gas filter having a housing with a gas inlet comprising a first port, a gas outlet comprising a second port, and at least one chamber therebetween containing carbon nanotubes, the chamber having a third port for simultaneous gas ingress to and gas egress from the carbon nanotubes through said third port; and
a compressor for feeding gas into the gas inlet.

39. A gas filtration system according to claim 38, wherein the compressor is configured to compress gas by a factor of at least five.

40. Method of filtering gas, comprising the steps of:
providing a gas filter comprising a housing having a gas inlet comprising a first port, a gas outlet comprising a second port and at least one chamber therebetween containing carbon nanotubes, the chamber having a third port; and
flowing gas into the first gas inlet port, thereafter simultaneously to and then from the carbon nanotubes through said third port, thereafter out of the second gas outlet port.

41. Method according to claim 40, wherein the gas is carbon dioxide.

42. Method according to claim 40, wherein the carbon nanotubes are single-walled carbon nanotubes.

43. Method according to claim 40, wherein the carbon nanotubes are multi-walled carbon nanotubes.

44. Method according to claim 40, wherein the carbon nanotubes are modified carbon nanotubes.

45. Method according to claim 44, wherein the carbon nanotubes are modified via 3-aminopropyl-triethoxysilane.

46. Method according to claim 40, wherein the carbon nanotubes are arranged in bundles.

47. Method according to claim 40, wherein the gas filter consists of a single chamber.

48. Method according to claim 40, wherein the gas filter comprises multiple chambers.

49. Method according to claim 48, wherein the gas filter comprises at least four chambers.

50. Method according to claim 40, wherein the chamber is cylindrical and has a third port defining a circular area through which gas ingress and egress takes place.

51. Method according to claim 40, wherein the chamber is annular in cross section.

52. Method according to claim 51, wherein the chamber has a third port defining an annular area through which gas ingress and egress takes place.

53. Method according to claim 51, wherein the gas filter comprises a plurality of concentric chambers.

54. Method according to claim 53, wherein the chambers are defined between a plurality of concentric, axially-extending walls.

55. Method according to claim 51, wherein the chamber has a third port defining a cylindrical area through which gas ingress and egress takes place.

56. Method according to claim 55, wherein the gas filter comprises a plurality of co-axial annular chambers.

57. Method according to claim 56, wherein the chambers are defined by a plurality of axially-spaced, radially-extending walls.

58. Method according to claim 40, wherein the gas inlet is configured to promote gas flow circulation around the carbon nanotubes in the at least one chamber.

59. Method according to claim 58, wherein the gas inlet is configured to promote flow swirl and jet-like instabilities.

60. Method according to claim 40, wherein the first port has a circular section.

61. Method according to claim 60, wherein the gas inlet comprises multiple first ports of circular section.

62. Method according to claim 40, wherein the axis of the third port is substantially parallel to the flow axis of the gas inlet.

63. Method according to claim 62, wherein the first port is formed in a first wall of the housing and the third port is formed in a second wall facing the first wall.

64. Method according to claim 40, wherein the axis of the third port is substantially perpendicular to the flow axis of the gas inlet.

65. Method according to claim 40, wherein at least one nanofilter is placed at the gas inlet, thereby allowing the gas mixture to flow into the gas filter while preventing the nanotubes flowing out of the gas filter.

66. Method according to claim 40, wherein at least one nanofilter is placed at the gas outlet of the gas filter, thereby allowing the filtered gas mixture to flow out of the gas filter while preventing the nanotubes flowing out of the gas filter.

67. Method according to claim 40, wherein the housing is a cylinder.

68. Method according to claim 67, wherein the gas inlet is formed in a first wall at one end of the cylinder, the first wall being releasably attached to the housing.

69. Method according to claim 40, wherein the flow axis of the gas outlet is substantially parallel to the flow axis of the gas inlet.

70. Method according to claim 69, wherein the gas outlet is formed in a second wall at the opposite end of the cylinder to the first wall.

71. Method according to claim 40, wherein the flow axis of the gas outlet is substantially perpendicular to the flow axis of the gas inlet.

72. Method according to claim 71, wherein the gas outlet is formed in the side, circumferential wall of the cylinder.

* * * * *